United States Patent
Hsieh

Patent Number: 5,971,373
Date of Patent: Oct. 26, 1999

[54] MULTI-CYLINDER BUFFER DEVICE

[76] Inventor: Wen-Yuan Hsieh, 58, Ma Yuan West St., Taichung, Taiwan

[21] Appl. No.: 09/015,700

[22] Filed: Jan. 29, 1998

[51] Int. Cl.[6] .................................................. B60G 21/02
[52] U.S. Cl. .......................... 267/118; 267/34; 267/226; 188/314
[58] Field of Search .................................... 207/118, 119, 207/249, 256, 251, 34, 289, 136, 151, 139, 127, 128, 226, 113; 188/314

[56] References Cited

U.S. PATENT DOCUMENTS

| | | | |
|---|---|---|---|
| 2,905,458 | 9/1959 | Mason | 267/128 |
| 4,712,412 | 12/1987 | Roos et al. | 267/119 |
| 4,973,077 | 11/1990 | Kuwayama et al. | 267/34 |

*Primary Examiner*—Matthew C. Graham

[57] ABSTRACT

A buffer device has a plurality of positioning seats, a base seat disposed on the positioning seats, and a main cylinder and a plurality of auxiliary cylinders disposed on the base seat. The base seat has a main oil channel, a plurality of oil inlet channels communicating with the main oil channel, and a plurality of oil return channels communicating with the main oil channel. The main oil channel communicates with the auxiliary cylinders. The oil inlet channels communicate with the main cylinder. Each oil inlet channel has a one-way valve. The oil return channels communicate with the main cylinder. A release valve blocks each oil return channel. A compression spring is disposed in the main cylinder. A piston rod extends from the main cylinder. Each auxiliary cylinder has a coiled spring and a piston.

1 Claim, 4 Drawing Sheets

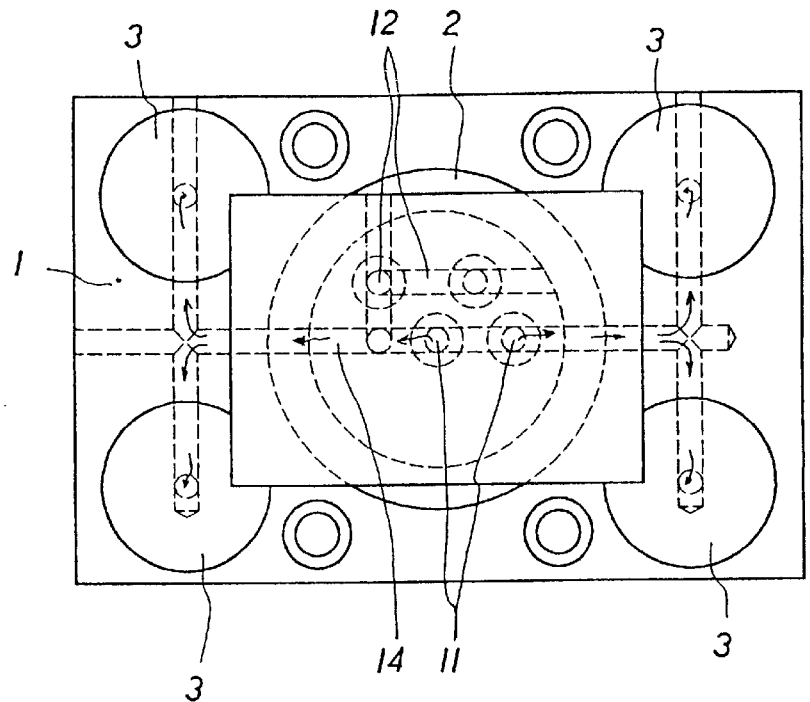
F I G. 2
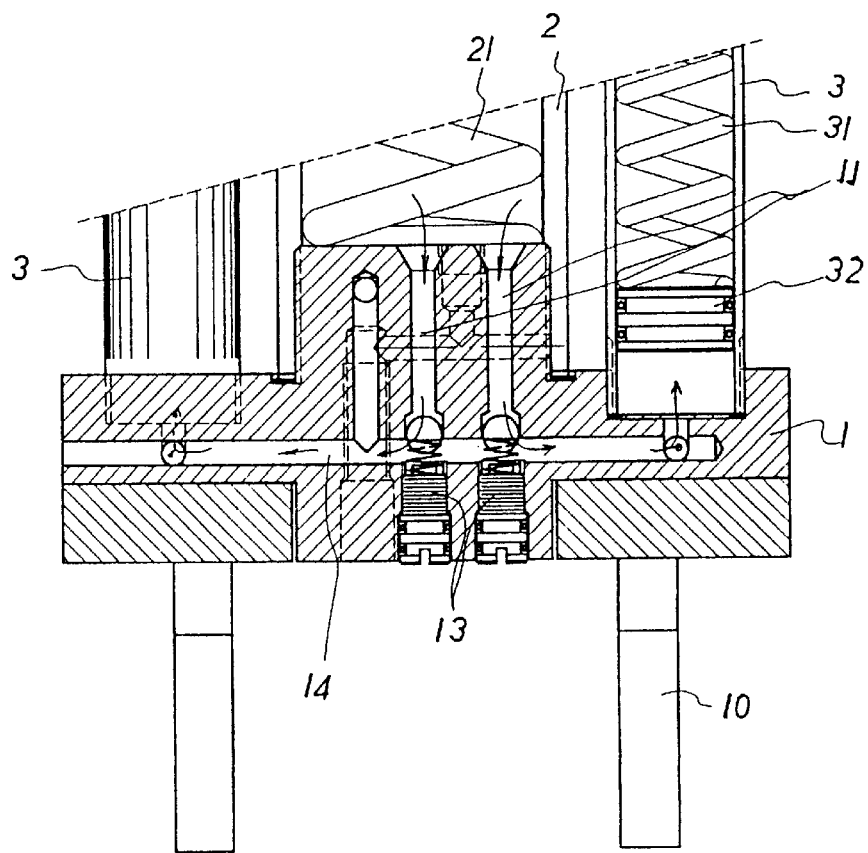
F I G. 3

MULTI-CYLINDER BUFFER DEVICE

BACKGROUND OF THE INVENTION

The present invention relates to a buffer device. More particularly, the present invention relates to a buffer device which can buffer a shock efficiently.

A conventional spring-type buffer device can absorb an active force. However, the spring will produce a reactive force and release the absorbed energy. Further, the compression range of a spring is limited so that the conventional spring-type buffer device may not absorb all the active force.

SUMMARY OF THE INVENTION

An object of the present invention is to provide a buffer device which can buffer a shock efficiently.

Accordingly, a buffer device comprises a plurality of parallel positioning seats, a base seat disposed on the positioning seats, and a main cylinder and a plurality of auxiliary cylinders disposed on the base seat. The base seat has a main oil channel, a plurality of oil inlet channels communicating with the main oil channel, and a plurality of oil return channels communicating with the main oil channel. The main oil channel communicates with the auxiliary cylinders. The oil inlet channels communicate with the main cylinder. Each oil inlet channel has a one-way valve. The oil return channels communicate with the main cylinder. A release valve blocks each oil return channel. A compression spring is disposed in the main cylinder. A piston rod extends from the main cylinder. Each auxiliary cylinder has a coiled spring and a piston.

BRIEF DESCRIPTION OF THE DRAWINGS

FIG. 2 is a schematic view illustrating the auxiliary cylinders releasing oils into the main cylinder;

FIG. 3 is a partially sectional view illustrating the auxiliary cylinders releasing oils into the main cylinder;

DETAILED DESCRIPTION OF THE INVENTION

Figure 1:
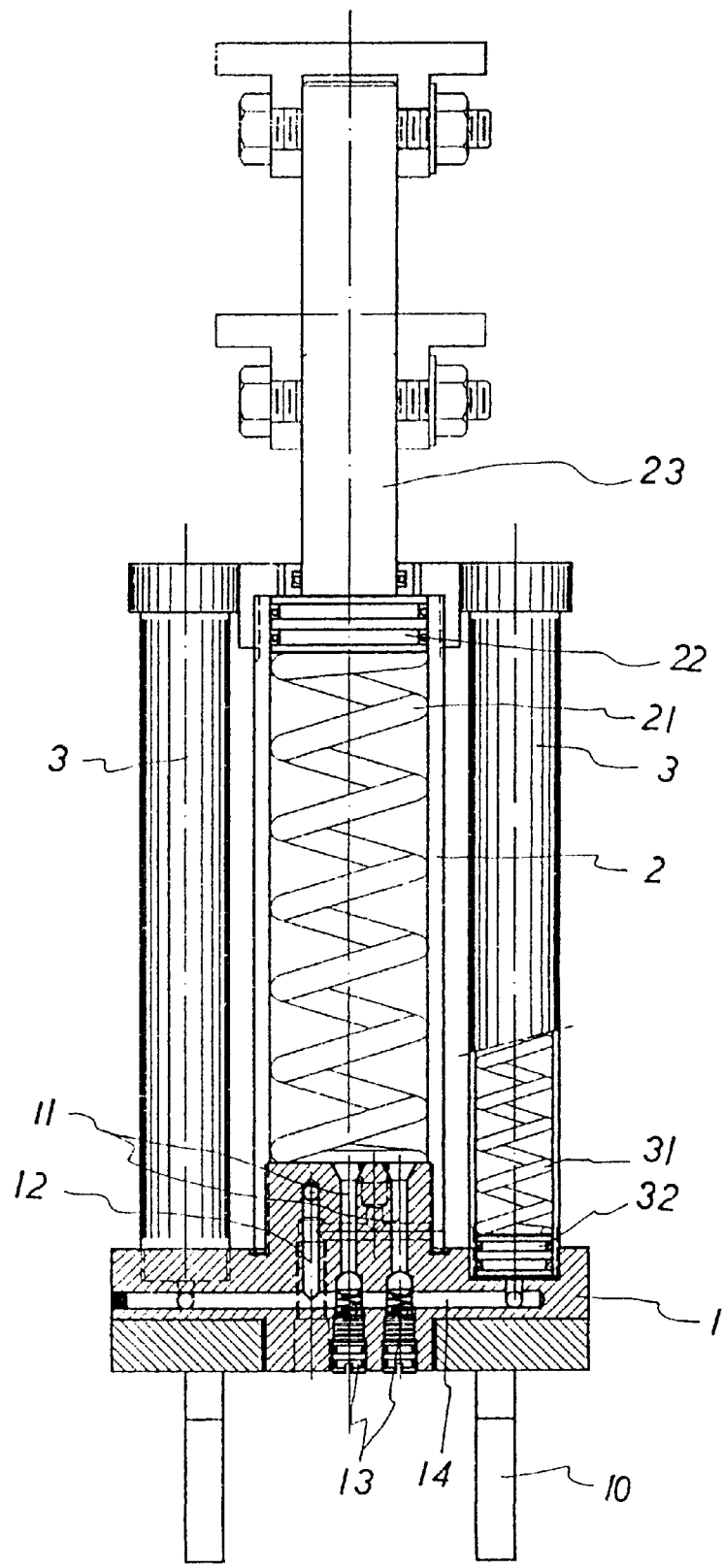
FIG. 1 is a sectional assembly view of a buffer device of a preferred embodiment in accordance with the present invention.

Referring to FIGS. 1 to 3, a buffer device comprises a plurality of parallel positioning seats 10, a base seat 1 disposed on the positioning seats 10, and a main cylinder 2 and a plurality of auxiliary cylinders 3 disposed on the base seat 1. The base seat 1 has a main oil channel 14, a plurality of oil inlet channels 11 communicating with the main oil channel 14, and a plurality of oil return channels 12 communicating with the main oil channel 14. The main oil channel 14 communicates with the auxiliary cylinders 3. The oil inlet channels 11 communicate with the main cylinder 2. Each oil inlet channel 11 has a one-way valve 13. The oil return channels 12 communicate with the main cylinder 2.

Figure 5:
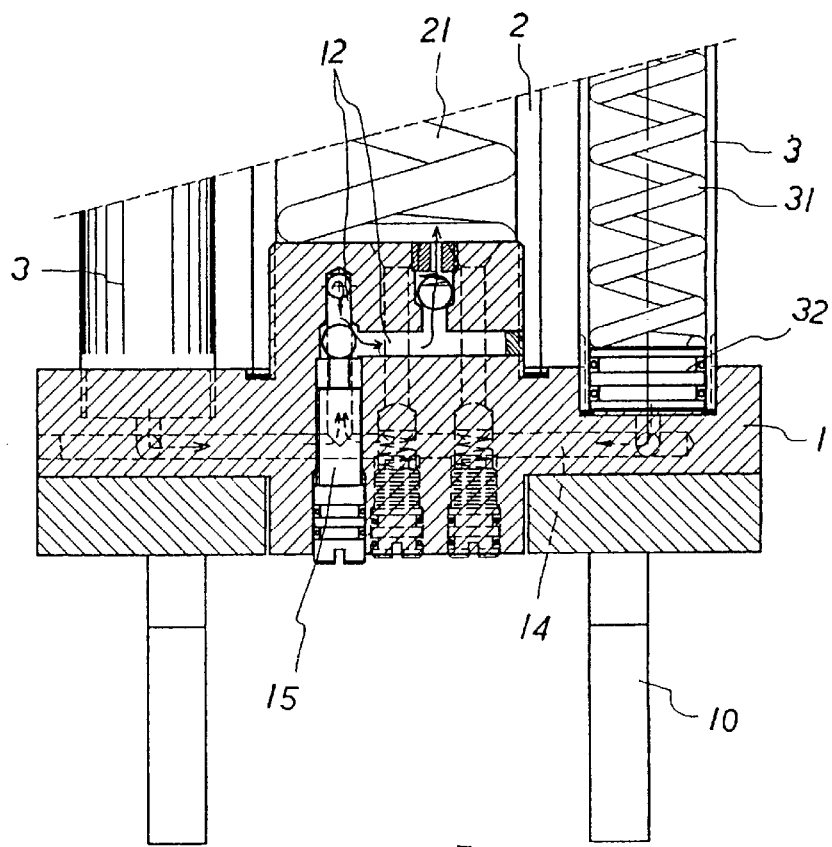
FIG. 5 is a partially sectional view illustrating the main cylinder releasing oils into the auxiliary cylinders.
Figure 6:
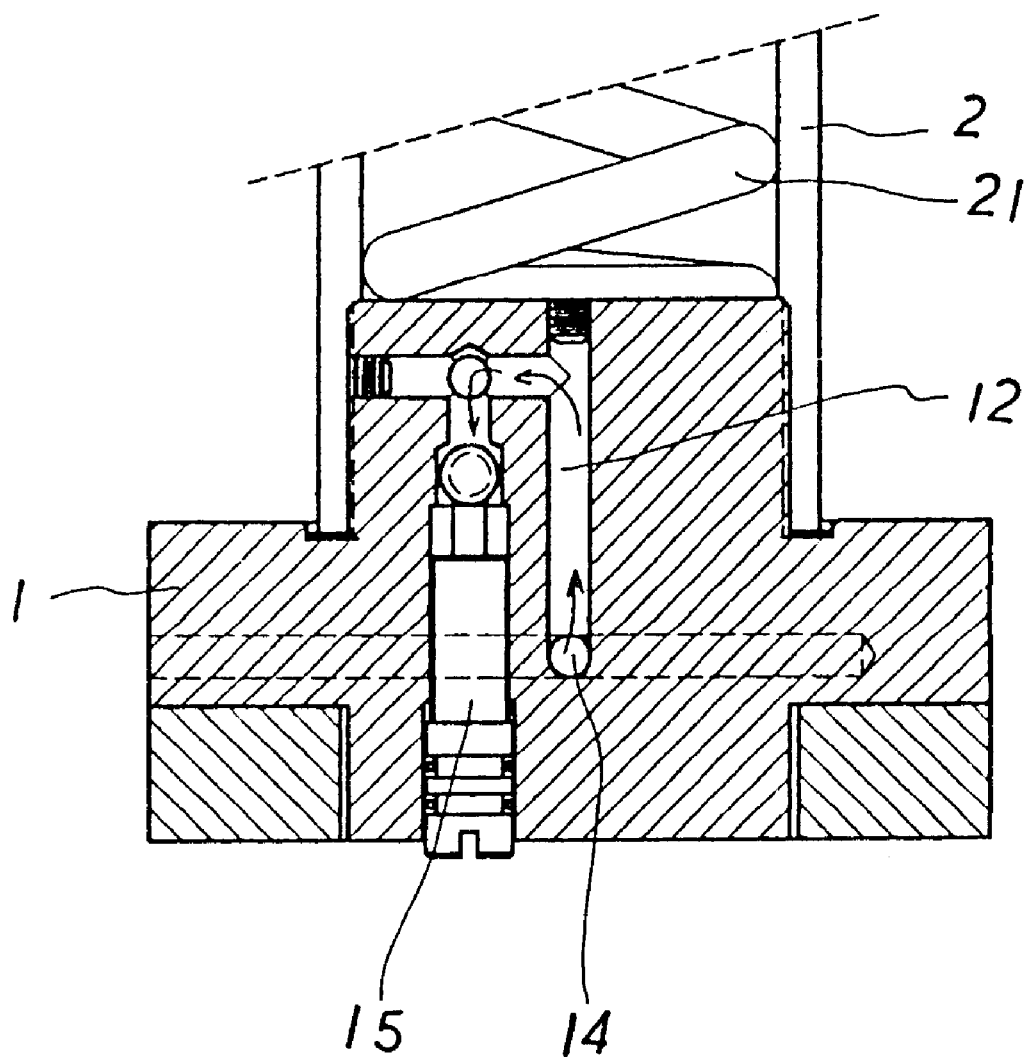
FIG. 6 is another partially sectional view illustrating the main cylinder releasing oils into the auxiliary cylinders.

Referring to FIGS. 5 and 6, a release valve 15 blocks each oil return channel 12.

Referring to FIGS. 1 to 3 again, a compression spring 21 is disposed in the main cylinder 2. A piston rod 23 extends from the main cylinder 2. A top end of the piston rod 23 is connected to an article which will be bumped (not shown in the figures). Each auxiliary cylinder 3 has a coiled spring 31 and a piston 32.

When the article is bumped by an external force, the piston rod 23 moves downward. The compression spring 21 is compressed by the piston rod 23. The oil in the main cylinder 2 flows from the oil inlet channels 11 and the main oil channel 14 into the auxiliary cylinders 3. Thus the piston 32 will compress the respective coiled spring 31. The oil is forbidden to flow into the oil inlet channel 11 by the one-way valve 13. At the same time, the release valve 15 is closed.

Figure 4:
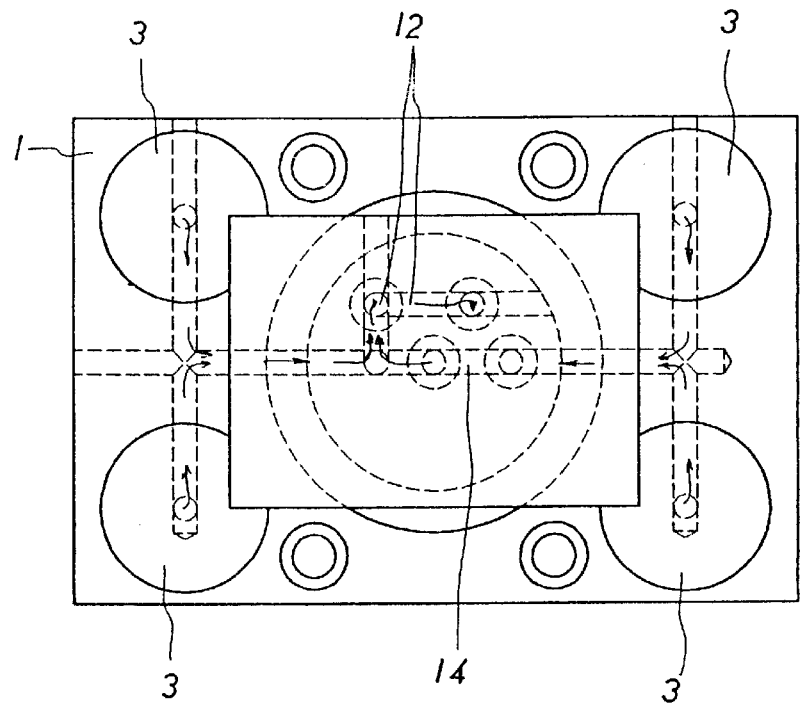
FIG. 4 is a schematic view illustrating the main cylinder releasing oils into the auxiliary cylinders.

Referring to FIGS. 4 to 6, the release valve 15 can be opened after the external force disappears. The oil in the auxiliary cylinders 3 will flow from the main oil channel 14 and the oil return channels 12 into the main cylinder 2.

The invention is not limited to the above embodiment but various modification thereof may be made. Further, various changes in form and detail may be made without departing from the scope of the invention.

I claim:

1. A buffer device comprises:

a plurality of parallel positioning seats, a base seat disposed on the positioning seats, a main cylinder and a plurality of auxiliary cylinders disposed on the base seat, the base seat having a main oil channel, a plurality of oil inlet channels communicating with the main oil channel, and a plurality of oil return channels communicating with the main oil channel, the main oil channel communicating with the auxiliary cylinders, the oil inlet channels communicating with the main cylinder, each said oil inlet channel having a one-way valve, the oil return channels communicating with the main cylinder, a release valve blocking each said oil return channel, a compression spring disposed in the main cylinder, a piston rod extending from the main cylinder, and each said auxiliary cylinder having a coiled spring and a piston.

* * * * *